(12) United States Patent
Williams

(10) Patent No.: US 6,648,574 B2
(45) Date of Patent: Nov. 18, 2003

(54) TRANSPORT MECHANISM FOR A STORAGE SYSTEM

(75) Inventor: David Lloyd Williams, Newport Beach, CA (US)

(73) Assignee: Quantum Corporation, San Jose, CA (US)

(*) Notice: Subject to any disclaimer, the term of this patent is extended or adjusted under 35 U.S.C. 154(b) by 0 days.

(21) Appl. No.: 10/183,787

(22) Filed: Jun. 25, 2002

(65) Prior Publication Data

US 2002/0168252 A1 Nov. 14, 2002

Related U.S. Application Data

(62) Division of application No. 09/482,148, filed on Jan. 12, 2000, now Pat. No. 6,488,462.

(51) Int. Cl.[7] ................................................. B65G 1/06
(52) U.S. Cl. ........................ 414/277; 369/34; 414/807
(58) Field of Search ................................. 414/277, 807; 369/34; 360/92; 198/375

(56) References Cited

U.S. PATENT DOCUMENTS

| | | |
|---|---|---|
| 3,715,040 A | 2/1973 | Polus et al. |
| 4,772,968 A | 9/1988 | Nonaka et al. |
| 4,864,438 A | 9/1989 | Munro |
| 4,932,826 A | 6/1990 | Moy et al. |
| 4,937,690 A | 6/1990 | Yamashita et al. |
| 5,274,516 A | 12/1993 | Kakuta et al. |
| 5,429,470 A | 7/1995 | Nicol et al. |
| 5,532,931 A | 7/1996 | Erickson et al. |
| 5,570,337 A | 10/1996 | Dang |
| 5,610,882 A | 3/1997 | Dang et al. |
| 5,700,125 A | 12/1997 | Falce et al. |
| 5,760,995 A | 6/1998 | Heller et al. |
| 5,924,545 A | 7/1999 | Crorey |
| 5,933,396 A | 8/1999 | Hammar et al. |
| 5,936,796 A | 8/1999 | Haneda |
| 6,011,669 A | 1/2000 | Apple et al. |
| 6,059,509 A | 5/2000 | Ostwald |
| 6,068,436 A | 5/2000 | Black et al. |
| 6,094,322 A | 7/2000 | Nakagoni et al. |
| 6,273,237 B1 | 8/2001 | Bazydola et al. |
| 6,438,623 B1 * | 8/2002 | Ryan ............................ 710/2 |
| 6,457,928 B1 * | 10/2002 | Ryan ........................ 414/281 |
| 2001/0001635 A1 * | 5/2001 | Mueller et al. ............ 414/277 |

* cited by examiner

Primary Examiner—James W. Keenan
(74) Attorney, Agent, or Firm—Steven G. Roeder; James P. Broder

(57) ABSTRACT

The present invention is directed to a storage system (10) including at least two tape libraries (11) and a transport mechanism (22) for transferring cartridges (20) between the tape libraries (11). The transport mechanism (22) includes a frame (64), a transporter (68) and a mover (66). The transporter (68) is sized and shaped to retain the cartridge (20). The mover (66) moves the transporter (68) along the frame (64). Additionally, the mover (66) pivots at least a portion of the transporter (68) between a first, almost horizontal, load/unload position (70A), a transport position (72) and a second, almost horizontal load/unload position (70B) during movement between the tape libraries (11). Further, the transport mechanism (22) includes a latch (140) that selectively retains the cartridge (20) in the transporter (68) during movement between the tape libraries (11). With this design, the transport mechanism (22) can reliably transfer one or more of cartridges (20) between tape libraries (11), through a relatively narrow opening, without interrupting the operation of the tape libraries (11).

66 Claims, 8 Drawing Sheets

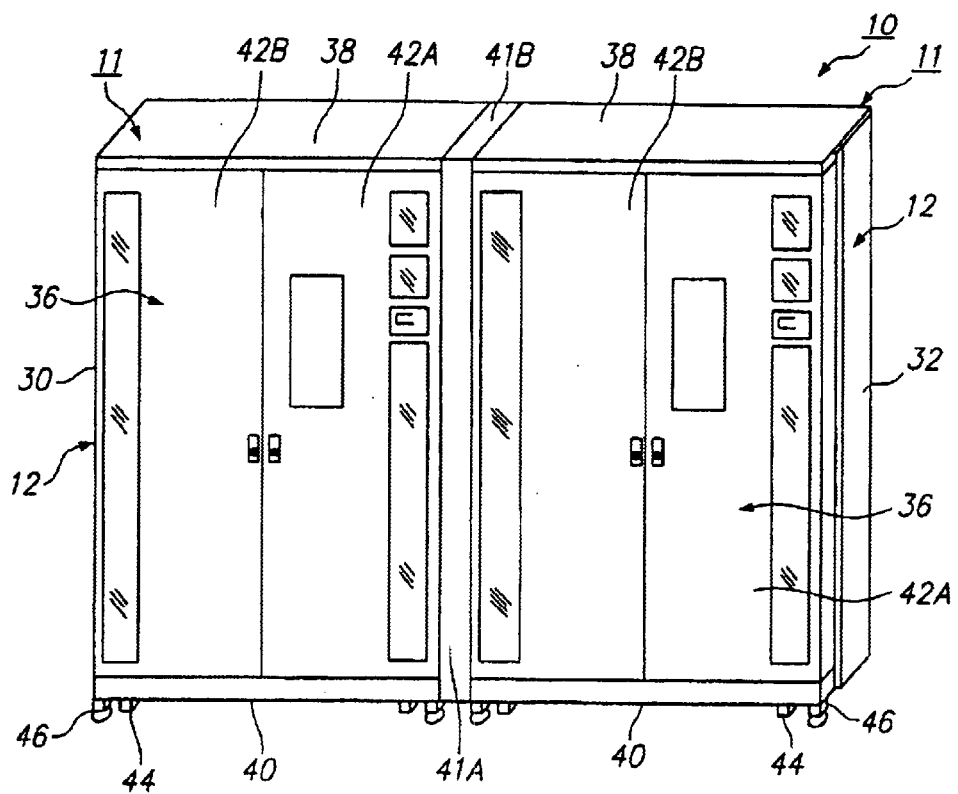
FIG. 1
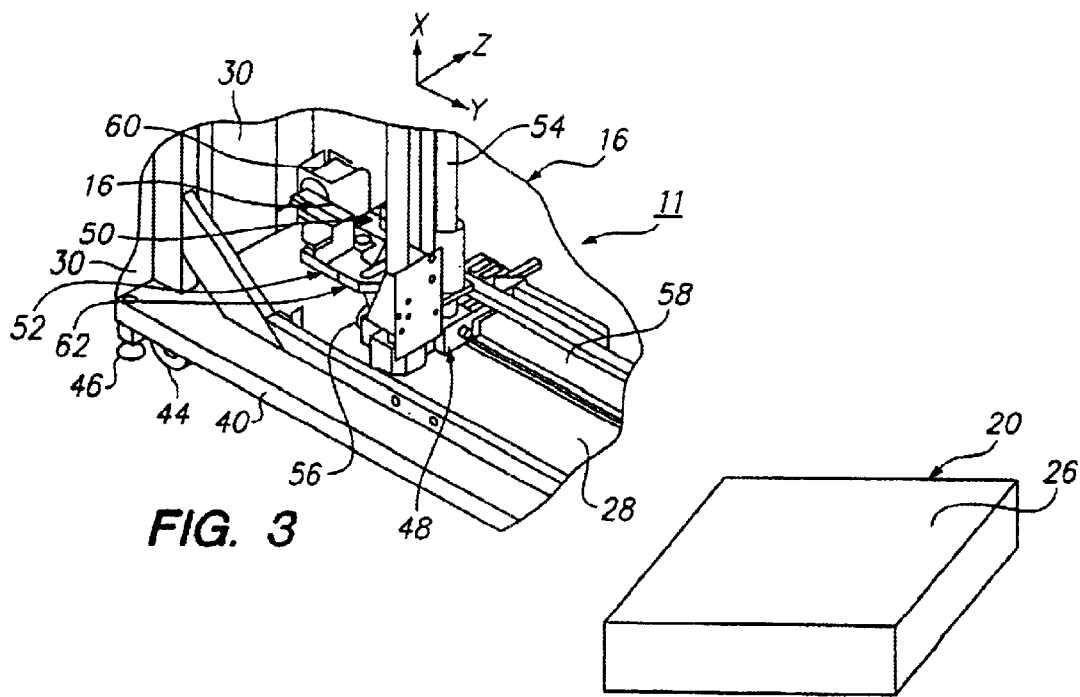
FIG. 3
FIG. 4

TRANSPORT MECHANISM FOR A STORAGE SYSTEM

CROSS-REFERENCE TO RELATED APPLICATION

This application is a divisional of Application Ser. No. 09/482,148 filed on Jan. 12, 2000, now U.S. Pat. No. 6,488,462. The contents of application Ser. No. 09/482,148 is incorporated herein by reference.

FIELD OF THE INVENTION

The present invention relates generally to digital storage systems. More specifically, the present invention relates to a transport mechanism for transferring cartridges between tape libraries of a storage system and a method for transferring cartridges between tape libraries of a storage system.

BACKGROUND

Automated storage systems are used for storing and retrieving relatively large amounts of information in digital form. One type of storage system includes one or more individual tape libraries that are positioned adjacent to each other. With this type of system, each tape library can include a library housing, a plurality of cartridges retained in a plurality of storage bins within the library housing, a robotic cartridge handling mechanism and one or more cartridge readers. The robotic cartridge handling mechanism individually retrieves one of the cartridges from one of the storage bins and places the cartridge within one of the cartridge readers.

In certain instances, the information contained in one or more of the cartridges is in more demand than the information contained in other cartridges in the storage system. If these high demand cartridges are in the same tape library, the throughput of the storage system can be diminished because the cartridge handling mechanism and/or the cartridge reader is over burdened. In order to increase the throughput of the storage system, it is often necessary to distribute the high demand cartridges among the tape libraries. Further, if one or more of the cartridge readers of one tape library fail, it may also be necessary to transfer cartridges to another tape library.

Transfer mechanisms have been developed to transfer cartridges between tape libraries without interfering with the operation of the tape libraries. These transfer mechanisms typically include a frame and a receiver that receives the cartridge. Unfortunately, existing transport mechanisms are not completely satisfactory. In particular, existing transport mechanisms can take-up too much space within the tape library and/or require too much clearance to operate in the tape library. Further, existing transfer mechanisms can interfere with the operation of the cartridge handling mechanism. Moreover, some of the transport mechanisms require a relatively large opening through the tape library for clearance of the transport mechanism. The large opening can weaken the structure of the tape library.

In light of the above, it is an object of the present invention to provide an improved transport mechanism that transfers a cartridge from one tape library to another tape library in a storage system. Another object of the present invention is to provide a transport mechanism that does not interfere with the operation of the cartridge handling mechanism. Still another object of the present invention is to provide a transport mechanism that minimizes the opening required in the tape library for the transport mechanism. Yet another object of the present invention is to provide a storage system having improved durability, which is relatively easy and cost efficient to manufacture and utilize.

SUMMARY

The present invention is directed to a transport mechanism for moving a cartridge between tape libraries that satisfies these needs. The transport mechanism includes a frame, a transporter and a mover. The frame extends between the tape libraries. The transporter selectively receives the cartridge. The mover moves the transporter along the frame between the tape libraries.

Uniquely, the mover also pivots a portion of transporter and the cartridge relative to the frame during movement between the tape libraries. More specifically, the mover pivots a portion of the transporter and the cartridge between an almost horizontal, load/unload position and a transport position. In the transport position, the cartridge is securely retained in the transporter and the transport mechanism is more resistant to shock and vibration excitation. This increases the stability of the transport mechanism and reduces the likelihood of damage to the cartridge.

Further, in the transport position, the transporter has a smaller horizontal profile. With the smaller horizontal profile, the transporter can pass through a relatively narrow opening in each tape library. The smaller opening is advantageous because the structure of each tape library is not compromised. Additionally, the smaller horizontal profile provides more space in each tape library for the cartridge handling mechanism and the other components of the tape library, such as drive belts and electrical cables. Moreover, the overall depth of each tape library near the transport mechanism can be smaller. This feature allows the tape libraries to fit through smaller doorways at the customer sights.

Preferably, the transport mechanism includes a latch that selectively secures the cartridge in the transporter during movement between the tape libraries. Basically, the latch inhibits the cartridge from falling out of the transporter during movement between the tape libraries. As provided herein, the latch is selectively moved between a locked position and an unlocked position.

Additionally, the present invention includes a method for transferring a cartridge between two tape libraries. The method includes the steps of positioning a transport mechanism between the tape libraries, positioning the cartridge in a transporter, and pivoting at least a portion of the transporter relative to the frame.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a front perspective view of a storage system including two tape libraries having features of the present invention;

FIG. 3 is a perspective view of a portion of a tape library and a portion of a cartridge handling mechanism;

FIG. 4 is a perspective view of a cartridge;

DESCRIPTION

Figure 2:
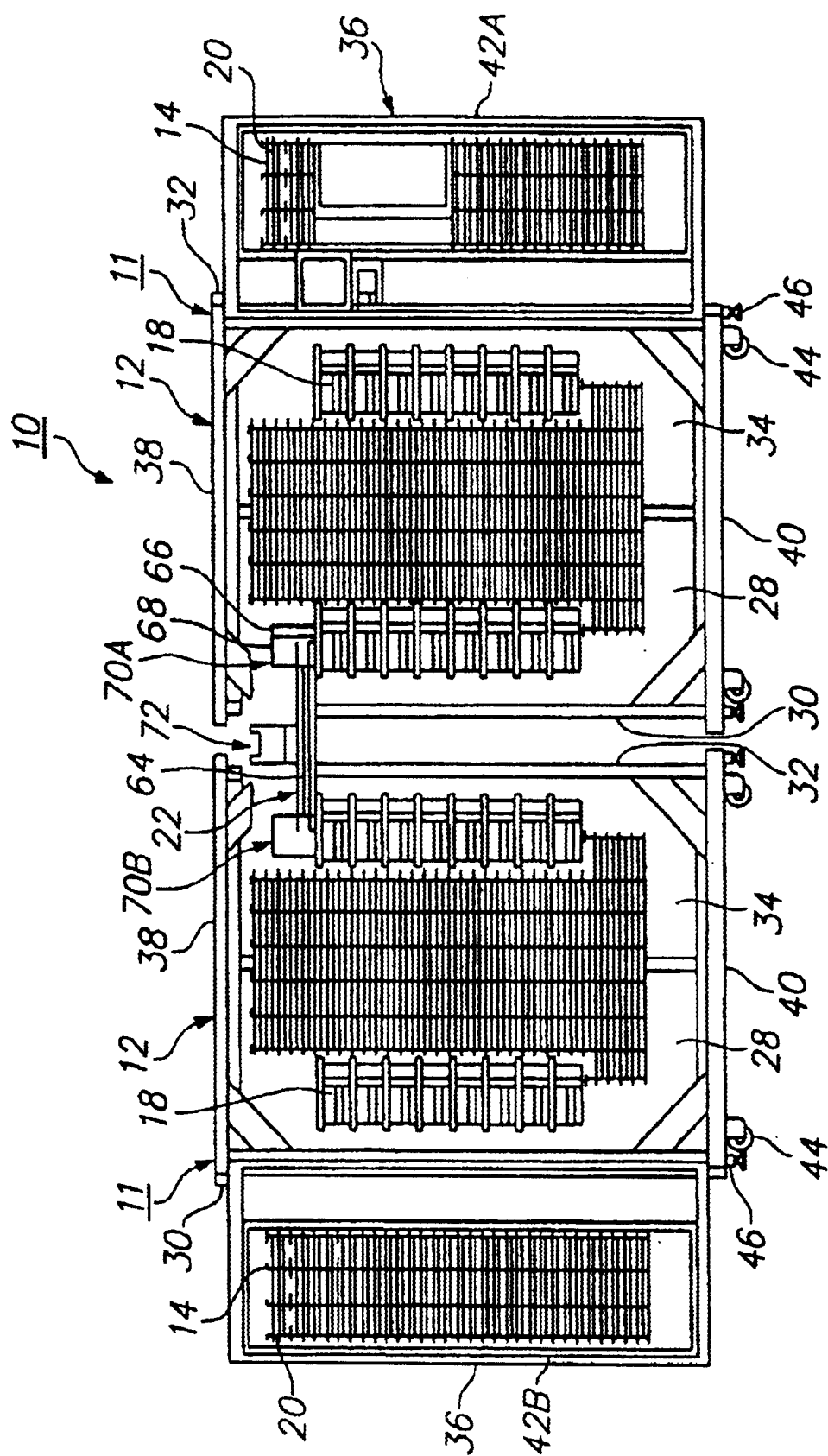
FIG. 2 is a partially cut-away, front plan view of the storage system of FIG. 1 with one of the doors of each tape library open and one of the doors of each tape library removed for clarity.

Referring initially to FIGS. 1–3, a storage system 10 having features of the present invention includes a plurality of tape libraries 11. Each tape library 11 includes a library housing 12, one or more storage bins 14 (illustrated in FIG. 2), one or more cartridge handling mechanisms 16 (illustrated in FIG. 3), one or more cartridge readers 18 (illustrated in FIG. 2), and one or more cartridges 20 (illustrated in FIG. 2). Further, the storage system 10 includes at least one transport mechanism 22 (illustrated in FIG. 2) that selectively transports the cartridges 20 between adjacent tape libraries 11 without interrupting the operation of the tape libraries 11.

Importantly, as provided below, the transport mechanism 22 rotates the cartridge 20 during transport. This allows the transport mechanism 22 to securely retain the cartridge 20 during transport. Further, this minimizes the horizontal profile of the transport mechanism 22 and provides more space in each tape library 11 for the cartridge handling mechanism 16 and other components of the tape library 11.

The number of individual tape libraries 11 in the storage system 10 can be varied according to the data storage requirements. Only two tape libraries 11 are illustrated in FIGS. 1 and 2. However, the storage system 10 can include more than two tape libraries 11. A suitable tape library 11 is sold under the trademark DLTT™ by the Assignee of the present invention, Quantum Corporation. Accordingly, only the structural aspects of the tape library 11 which are particularly significant to the present invention are provided herein.

The number of cartridges 20 in each tape library 11 and the configuration of the cartridges 20 can be varied to suit the design requirements of the storage system 10. Each cartridge 20 typically includes a storage medium (not shown) that stores data in a form that can be subsequently retrieved if necessary. A magnetic storage tape is commonly used in the cartridges 20 to store data in digital form. Referring to FIGS. 2 and 4, each cartridge 20 includes a substantially rectangular cartridge housing 26 that encloses the storage medium. A suitable cartridge 20 is sold by Quantum Corporation under the trademark DLT™.

Referring back to FIGS. 1 and 2, the library housing 12 retains the various components of each tape library 11. The design of the library housing 12 can be varied to suit the design requirements of the storage system 10. Each library housing 12 illustrated in the FIGS. 1 and 2 is substantially rectangular shaped and defines a substantially rectangular shaped library cavity 28. The library housing 12 includes (i) a planar, housing first side 30, (ii) a planar, housing second side 32 substantially opposite the housing first side 30, (iii) a planar, housing mid-wall 34 which extends between the housing first side 30 and the housing second side 32, (iv) a planar, housing back wall (not shown) which extends between the housing first side 30 and the housing second side 32, (v) a housing front side 36 which is substantially parallel with the housing mid-wall 34, (vi) a planar, housing top 38 and (vii) a planar, housing bottom 40.

As illustrated in FIG. 1, the storage system 10 can also include a planar front panel 41A and a planar top panel 41B that covers the gap between adjacent tape libraries 11.

Each housing front side 36 can include a right door 42A and a left door 42B which pivot open and allow for access into the library cavity 28. The right door 42A of one of the tape libraries 11 and the left door 42B of one of the tape libraries 11 in FIG. 2 were omitted for clarity. Additionally, each library housing 12 illustrated in FIGS. 1 and 2 includes a plurality of spaced apart casters 44 and a plurality of spaced apart leveling feet 46 which are secured to the housing bottom 40. The casters 44 allow each tape library 11 to be easily moved, while the leveling feet 46 can be adjusted to lift the casters 44 away from the ground (not shown) for permanent placement of each tape library 11.

The storage bins 14 retain the cartridges 20 within each tape library 11. The design, location and number of storage bins 14 can be varied according to the design of the cartridges 20 and each tape library 11. Typically, each storage bin 14 defines a rectangular shaped slot that is sized and shaped to retain a single cartridge 20. In the embodiment illustrated in the FIG. 2, one hundred and seventy storage bins 14 are secured to the mid-wall 34, ninety-six storage bins 14 are secured to the left door 42B and sixty storage bins 14 are secured to the right door 42A of each tape library 11.

The cartridge readers 18 transfer information to and from the cartridges 20. The design, location and the number of cartridge readers 18 can be varied to suit the requirements of the tape libraries 11. For the embodiments provided herein, a suitable cartridge reader 18 is a tape drive sold under the trademark DLT™, by Quantum Corporation. In the embodiment illustrated in FIG. 2, sixteen cartridge readers 18 are secured to the mid-wall 34 of each tape library 11. Alternately, for example, each tape library 11 can include more than sixteen or less than sixteen cartridge readers 18.

The cartridge handling mechanism 16 selectively moves and positions the cartridges 20 within the library cavity 28 of each tape library 11. More specifically, the cartridge handling mechanism 16 is adapted to retrieve any one of the cartridges 20 from any of the storage bins 14 and transfer the cartridge 20 to any one of the cartridge readers 18, another one of the storage bins 14 or the transport mechanism 22 in the tape library 11. Further, the cartridge handling mechanism 16 can individually move each cartridge 20 from the transport mechanism 22 to one of the storage bins 14 or one of the cartridge readers 18 in one of the tape libraries 11.

FIG. 3 illustrates a portion of cartridge handling mechanism 16 which can be used to move the cartridges 20 within the library cavity 28 of one of the tape libraries 11. The cartridge handling mechanism 16 includes a handling mechanism mover 48, a gripper assembly 50 and an extension axis assembly 52. The handling mechanism mover 48 moves the gripper assembly 50 relative to the storage bins 14, the cartridge readers 18, and the transport mechanism 22.

Preferably, the handling mechanism mover 48 moves the gripper assembly 50 along a X axis, a Y axis, and around the Y axis so that the gripper assembly 50 can move and position the cartridges 20 within the library cavity 28. Referring to FIG. 3, the handling mechanism mover 48 can include (i) a pair of spaced apart vertical guides 54 (only one is illustrated), (ii) a vertical actuator 56 for moving the gripper assembly 50 vertically along the vertical guides 54, (iii) a pair of spaced apart horizontal guides 58 (only one is illustrated), (iv) a horizontal actuator 60 which moves the gripper assembly 50 horizontally along the horizontal guides 58, and (v) a rotary actuator 62 which rotates the gripper assembly 50 around the Y axis. Rotation around the Y axis allows the gripper assembly 50 to transfer the cartridges 20 between (i) the storage bins 14 in the doors 42A, 42B, and (ii) storage bins 14 on the mid-wall 34, the cartridge readers 18 or the transport mechanism 22.

The gripper assembly 50 grips the individual cartridges 20 and allows for the transfer of the cartridges 20 within the library cavity 28. The gripper assembly 50 can be designed in many ways. For example, the gripper assembly 50 can include a lower jaw (not designated) and an upper jaw (not designated) that is moved relative to the lower jaw by a gripper motor (not designated) to selectively grasp a cartridge 20. The extension axis assembly 52 includes an actuator or motor that moves the gripper assembly 50 along the Z axis. Functionally, the extension axis assembly 52 extends the gripper assembly 50 forward to make contact with the desired cartridge 20 and subsequently retracts the gripper assembly 50 to remove the cartridge 20 from the storage bin 14, the cartridge reader 18 or the transport mechanism 22.

The cartridge handling mechanism 16 can also include a bar code scanner (not shown) that reads a bar code label (not shown) on the cartridges 20. The scanner preferably allows the tape library 11 to maintain an inventory of the cartridges 20 in each tape library 11. The scanner can also be used to identify and determine the position of a portion of the transport mechanism 22 as provided below.

The transport mechanism 22 allows for the transfer of cartridges 20 between tape libraries 11 in the storage system 10. More specifically, the transport mechanism 22 allows for the transfer of cartridges 20 from the library cavity 28 of one tape library 11 to the library cavity 28 of another tape library 11. A single tape transport mechanism 22 is illustrated in FIG. 2 for transferring cartridges 20 between adjacent tape libraries 11. Alternately, for example, the storage system 11 can include multiple transport mechanisms 22 to transfer cartridges 20 between multiple tape libraries 11.

The location of the transport mechanism 22 can be varied according to the design of the storage system 10. For example, in the embodiment illustrated in the Figures, the transport mechanism 22 extends through adjacent sides 30,32 of the tape libraries 11 and attaches to the mid-wall 34 of each tape library 11.

Additionally, the design of the transport mechanism 22 can be varied to suit the requirements of the cartridge 20. FIGS. 2, 5–8 illustrate a transport mechanism 22 having features of the present invention. In the embodiment illustrated in these Figures, the transport mechanism 22 includes a frame 64, a mover 66 and a transporter 68 which are described in detail below.

Uniquely, the mover 66 rotates a portion of the transporter 68 between a first load/unload position 70A, a transport position 72 and a second load/unload position 70B while moving the transporter 68 along the frame 64 between the tape libraries 11. The transport position 72 and the second load/unload position 70B are illustrated in phantom in FIGS. 2 and 8 with a portion of the frame 64 omitted for clarity. As an overview, the transporter 68 is in one of the load/unload positions 70A, 70B within each tape library 11 and the transport position 72 during movement between the tape libraries 11.

The frame 64 supports the components of the transport mechanism 22 and extends between the tape libraries 11. The design of the frame 64 can be varied to suit the design requirements of the transport mechanism 22. For example, as can best be seen with reference to FIGS. 5–8, the frame 64 can have a generally "U" shaped cross-section. In this embodiment, the frame 64 includes a planar, front wall 74, an opposed, planar back wall 76 and a planar, bottom wall 78 which connects the front wall 74 to the back wall 76. The frame 64 also includes a first end 80 and an opposed second end 82.

Spaced apart, first frame slots 84 extend through the back wall 76 near the first end 80 and spaced apart, second frame slots 86 (only one is illustrated) extend through the back wall 76 near the second end 82. Attachment bolts (not shown) extend through the frame apertures 84 and the frame slots 86 to secure the frame 64 to the mid-wall 34 of each tape library 11, above the cartridge readers 18.

As provided above, the mover 66 moves the transporter 68 along the frame 64 between the tape libraries 11. Further, the mover 66 rotates a portion of the transporter 68 between the load/unload positions 70A, 70B and the transport position 72. The design of the mover 66 can be varied according to the design of the transport mechanism 22. In the embodiments illustrated in the Figures, the mover 66 includes a carriage guide 88, a motor assembly 90, and a follower assembly 92.

Figure 5:
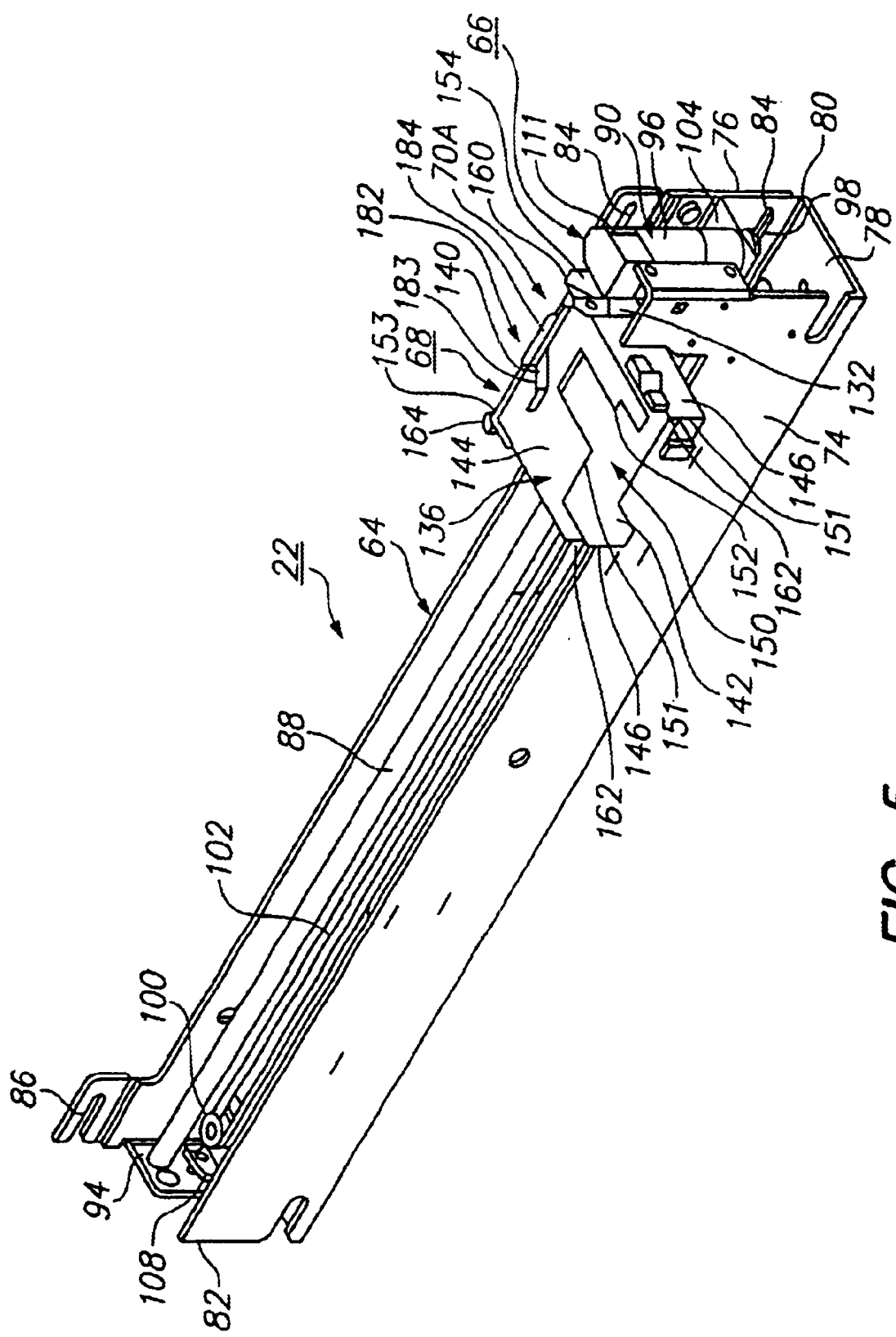
FIG. 5 is a perspective view of a transport mechanism having features of the present invention with a transporter in a load/unload position.
Figure 9:
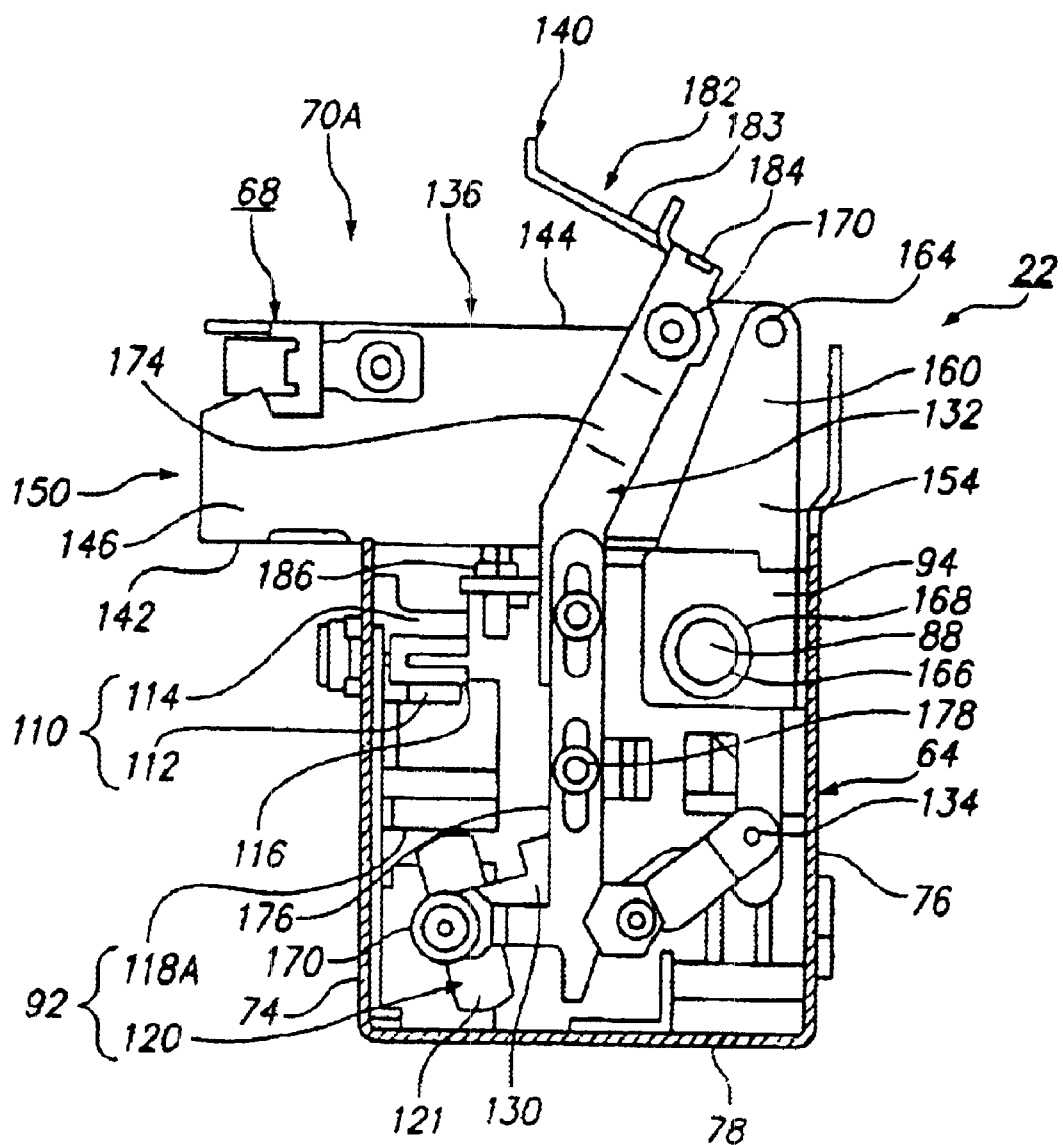
FIG. 9 is cut-away view taken on line 9—9 in FIG. 8.

The carriage guide 88 guides the transporter 68 substantially linearly along the frame 64. The carriage guide 88 illustrated in the Figures is a right, cylindrical shaped, shaft that extends along the frame 64 intermediate the walls 74, 76, 78. However, the shape and design of the carriage guide 88 can be varied. In the embodiment illustrated in the Figures, the carriage guide 88 is secured to the back wall 76, near each end 80, 82 with a pair of spaced apart carriage guide supports 94 (one carriage guide support 94 is illustrated in FIG. 5 and the other carriage guide support 94 is illustrated in FIG. 9).

The motor assembly 90 moves the transporter 68 along the frame 64 on the carriage guide 88. In the embodiment illustrated in the Figures, the motor assembly 90 includes a motor 96, a drive pulley 98, an idler pulley 100 and a drive belt 102.

The motor 96 is secured to the back wall 76 near the first end 80 of the frame 64 with a motor bracket 104. The motor 96 selectively rotates a drive shaft 106. The drive pulley 98 is positioned on the drive shaft 106 and rotates with the drive shaft 106. The idler pulley 100 is secured to one of the carriage guide supports 94 near the second end 82 of the frame 64 with a pulley bracket 108. The drive belt 102 extends between and wraps around the pulleys 98,100. The drive belt 102 is also secured to the transporter 68. With this design, rotation of the motor 96 rotates the drive pulley 98 and moves the drive belt 102 and transporter 68 along the carriage guide 88 and the frame 64.

Preferably, the motor assembly 90 also includes a sensor 110 and a motor encoder 111 for determining when the transporter 68 is near either end 80, 82 of the frame 64. With this setup, the sensor 110 and the motor encoder 111 are together used to stop rotation of the motor 96 when the transporter 68 is near each end 80, 82. The design of the sensor 110 can be varied. For example, the sensor 110 can be an electronic optical switch positioned near the first end 80 of the frame 64. In the embodiment illustrated in FIG. 9, the sensor 110 includes a light source 112 that directs a light beam (not shown) towards a spaced apart light receiver 114. The transporter 68 includes a protruding lip 116 that extends away from the transporter 68. With this design, the light receiver 114 detects when the lip 116 interrupts the light beam.

The follower assembly 92 facilitates rotation of a portion of the transporter 68 between the load/unload positions 70A, 70B and the transport position 72. The design of the follower assembly 92 can be varied. In the embodiment illustrated in the Figures, the follower assembly 92 includes an upper follower guide 118A, a spaced apart, lower follower guide 118B and a follower 120 including a wheel 121. The follower guides 118A, 118B guide the wheel 121 along a predetermined, non-linear path.

Figure 8:
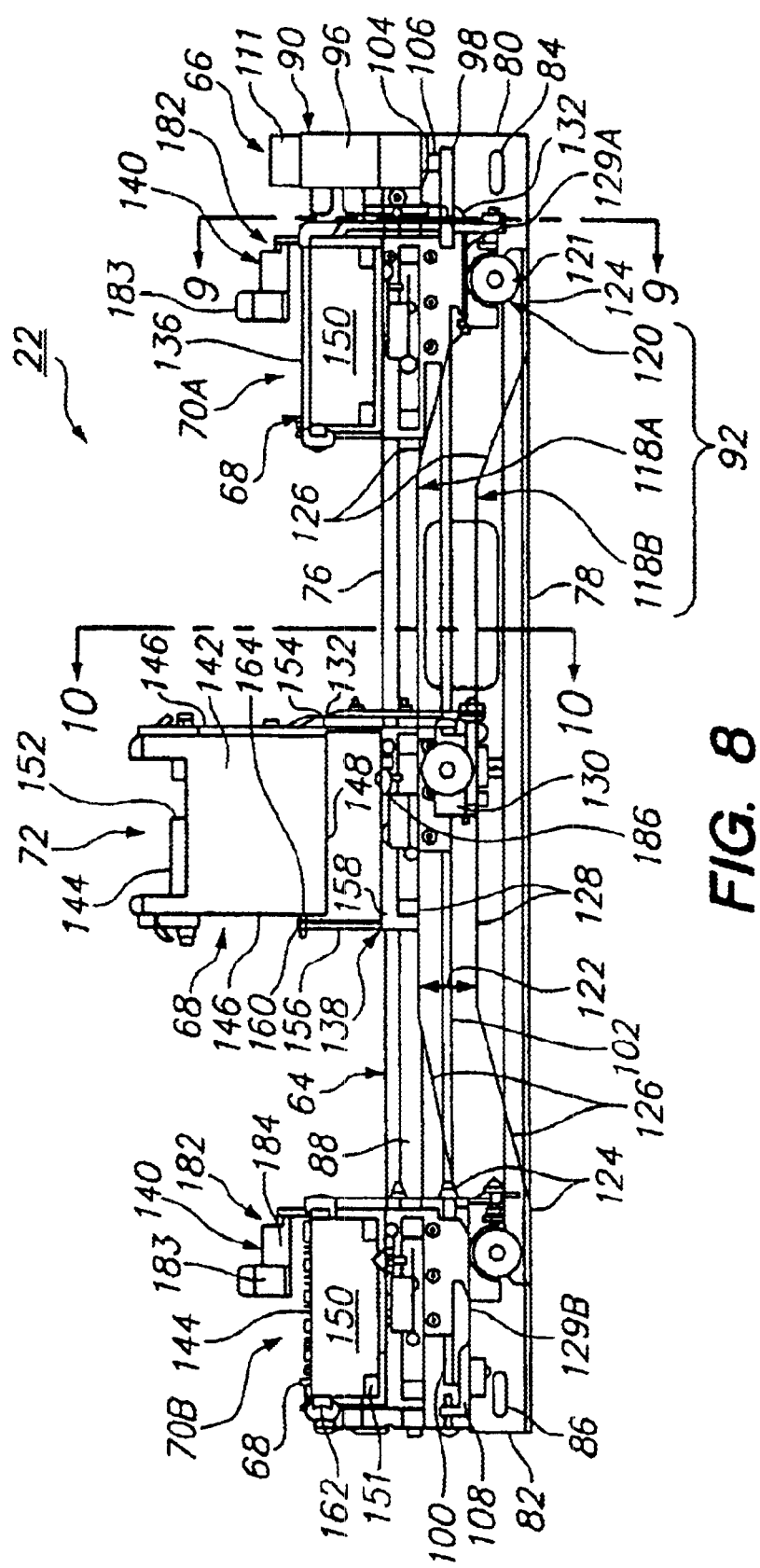
FIG. 8 front plan view of the transport mechanism with a portion of the transport mechanism removed for clarity and the transporter in multiple positions.

As can best be seen with reference to FIG. 8, each follower guide 118A, 118B is a thin rail secured to the frame 64. The follower guides 118A, 118B are spaced apart from each other a distance 122 which is slightly greater than the diameter of the wheel 121 so that the wheel 121 can rotate between the follower guides 118A, 118B. Each follower guide 118A, 118B includes a pair of spaced apart lower sections 124, a pair of spaced apart, ramped sections 126 and an upper section 128. One of the lower sections 124 is positioned near each of the ends 80, 82 of the frame 64. The upper section 128 is positioned between the two lower sections 124. Further, the ramped sections 126 are positioned between the lower sections 124 and the upper section 128. Adjustable follower guides 129A, 129B are located near the ends of the ramped sections 126. The position of the adjustable follower guides 129A, 129 can be adjusted relative to the frame 64.

In addition to the wheel 121, the follower 120 also includes a follower body 130. The wheel 121 is secured to and rotates relative to the follower body 130. The wheel 121 fits between the follower guides 118A, 118B and is guided by the follower guides 118A, 118B during movement along the frame 64. The follower body 130 is secured to the transporter 68 and moves with the transporter 68 along the frame 64. More specifically, the follower body 130 is secured to the transporter 68 with a linkage 132 and a link shaft 134 which allow the follower body 130 to pivot relative to the transporter 68 as described below.

The transporter 68 receives the cartridge 20 and is moved by the mover 66 between the adjacent tape libraries 11. The design of the transporter 68 can be varied to suit the design requirements of the transport mechanism 22. In the embodiment illustrated in the Figures, the transporter 68 includes a receiver body 136, a carriage 138, and a latch 140. The receiver body 136, the carriage 138 and the latch 140 all move together along the frame 64. However, the receiver body 136 and the latch 140 pivot relative to the carriage 138 at different rates.

The receiver body 136 is generally rectangular shaped and includes a bottom 142, a top 144, opposed sides 146 and a back 148 which cooperate to define a rectangular shaped receiver slot 150. The bottom 142 includes a pair of spaced apart lips 151 which extend upward near the opening for the receiver slot 150. The lips 151 are used in conjunction with the latch 140 as provided below to selectively retain the cartridge 20 in the receiver slot 150. The top 144 includes a cutout 152 that allows the latch 140 to contact the cartridge 20 as described below.

The receiver slot 150 is sized and shaped to receive one of the cartridges 20. Thus, the design of the receiver body 136 can be varied according to the design of the cartridge 20. Further, the receiver body 136 can be designed to selectively receive two or more cartridges 20 simultaneously. Additionally, a side aperture 153 extends through each side 146 near the top 144 and the back 148 of the receiver body 136. The side aperture 153 in each side 146 is used to pivot the receiver body 136 relative to the carriage 138 as described below.

The receiver body 136 preferably also includes a pair of spaced apart calibration targets 162. The scanner can be used to locate the calibration targets 162 to identify and determine the position of the receiver body 136. As is illustrated in FIG. 5, one of the calibration targets 162 can be secured to each of the opposed sides 146 of the receiver body 136.

Figure 6:
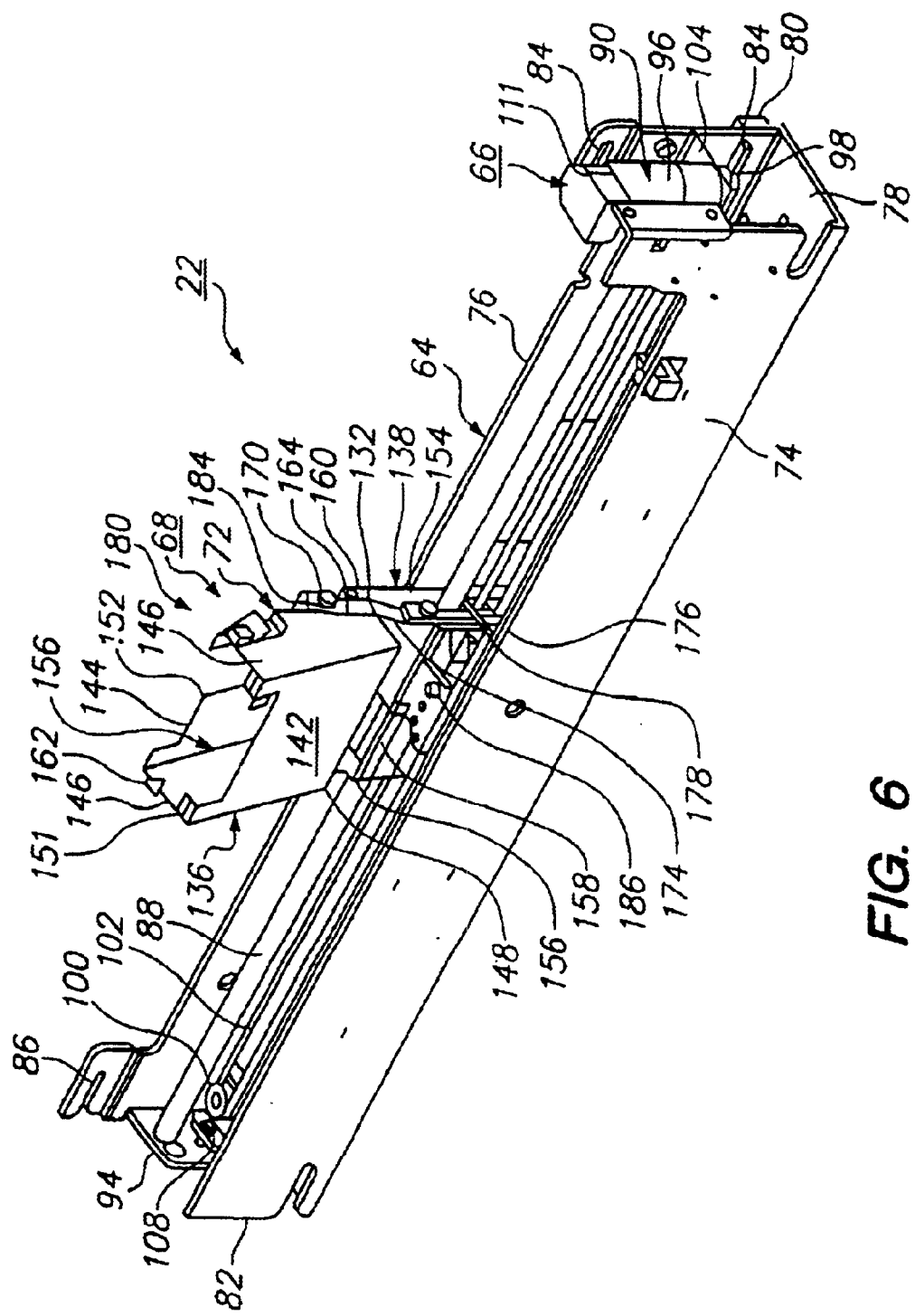
FIG. 6 is a perspective view of the transport mechanism of FIG. 5 with the transporter in a transport position.
Figure 7:
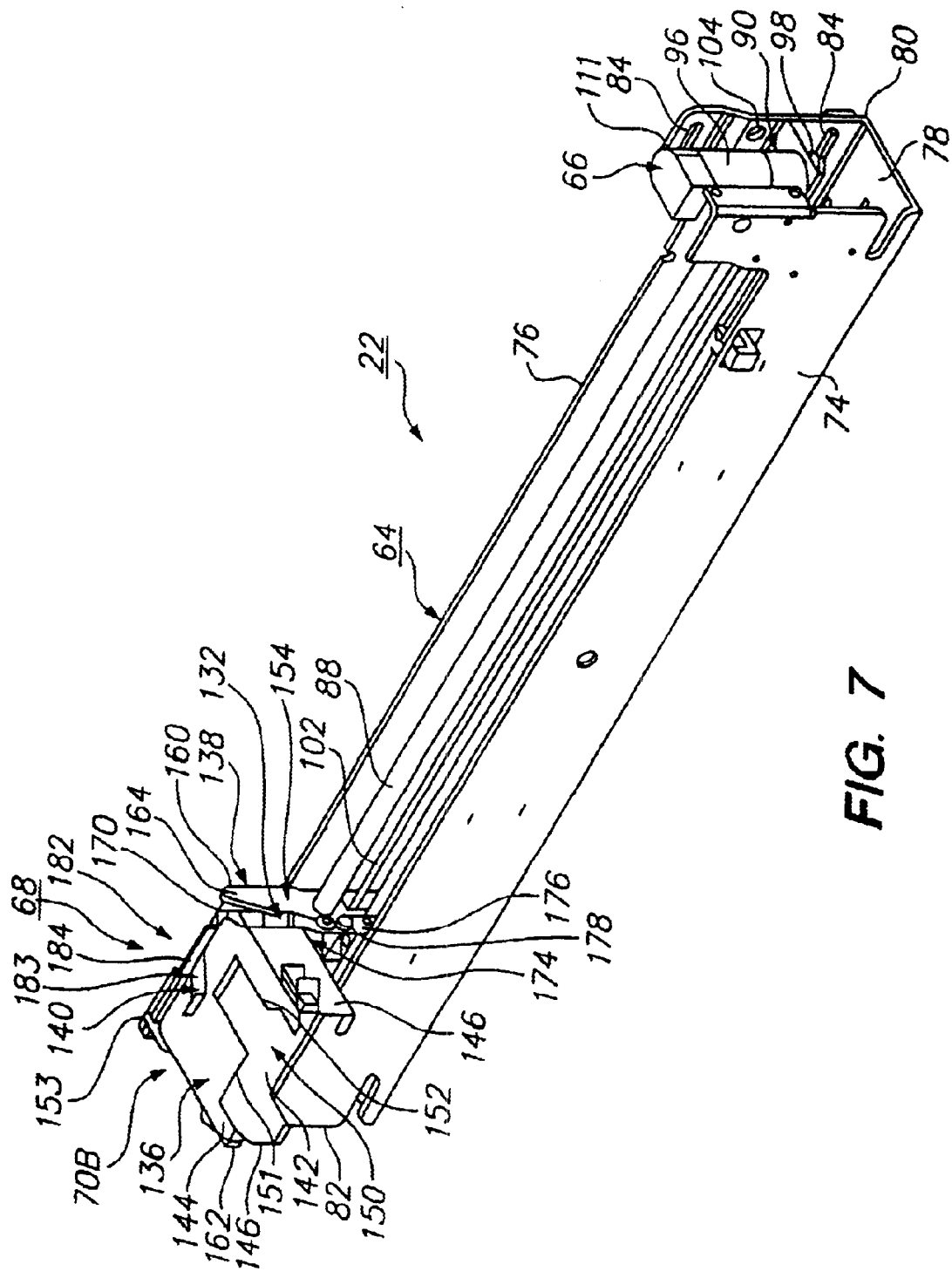
FIG. 7 is a perspective view of the transport mechanism of FIG. 5 with the transporter in another load/unload position.
Figure 10:
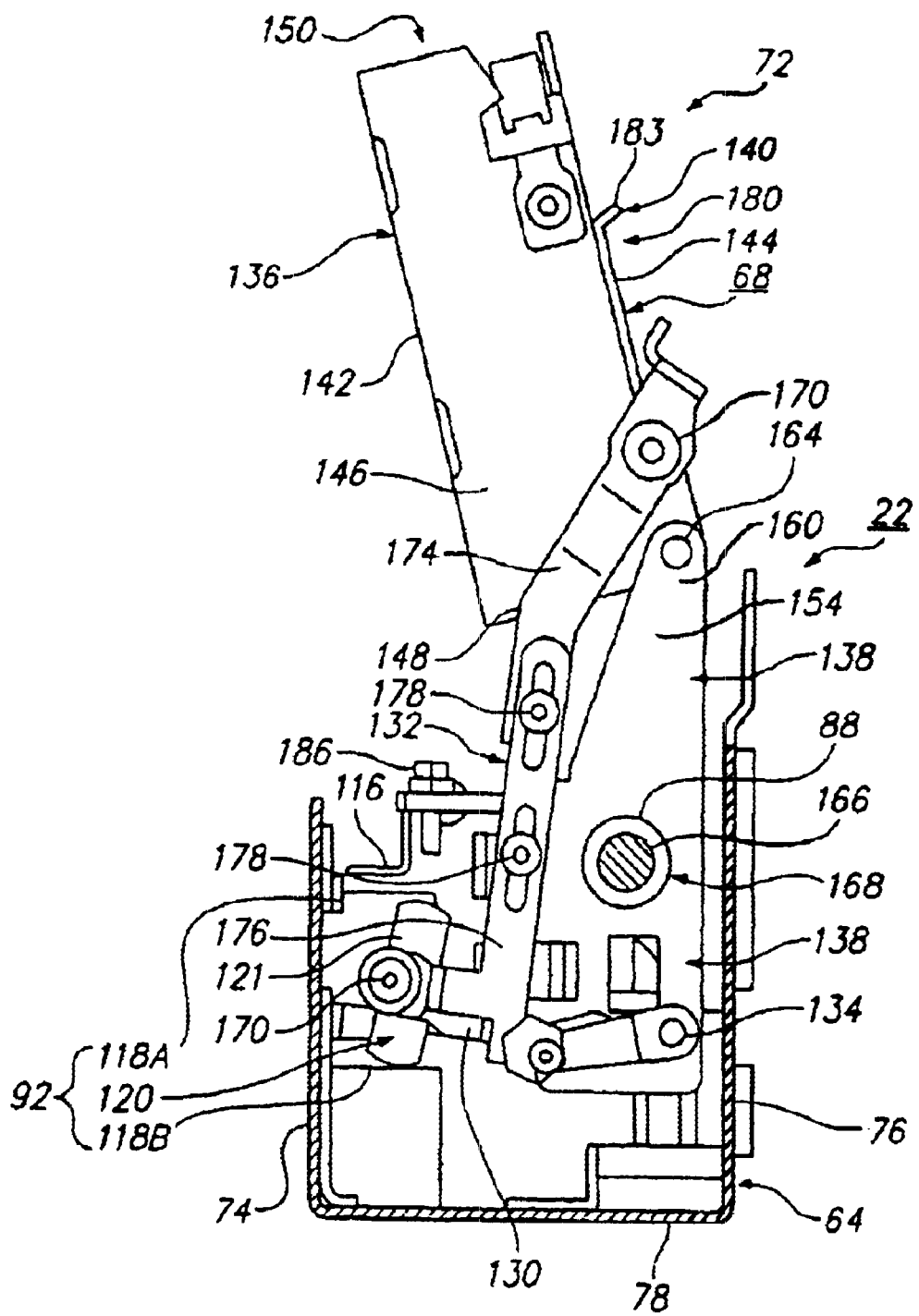
FIG. 10 is a cut-away view taken on line 10—10 in FIG. 8.

FIGS. 2 and 8 illustrate the receiver body 136 in the first load/unload positions 70A, the transport position 72 (in phantom) and the second load/unload position 70B (in phantom). FIGS. 5 and 9 illustrate the receiver body 136 in the first load/unload position 70A, FIG. 7 illustrates the receiver body 136 in the second load/unload position 70B and FIGS. 6 and 10 illustrate the receiver body 136 in the transport position 72.

In the embodiments provided herein, in the load/unload positions 70A, 70B, the receiver body 136 is generally horizontal. In the transport position 72, the receiver body 136 is almost vertical. More specifically, the receiver body 136 is rotated between approximately forty-five and ninety degrees from the load/unload positions 70A, 70B to the transport position 72. Referring back to FIG. 2, the receiver body 136 is positioned above one of the cartridge readers 18 when in the load/unload positions 70A, 70B. This allows the cartridge handling mechanism 16 to insert or remove a cartridge 20 from the receiver body 136.

Importantly, rotation of the receiver body 136 to the transport position 72 allows the transport mechanism 22 to securely retain the cartridge 20 during transport. Further, this minimizes the horizontal profile of the transport mechanism 22 and provides more space in each tape library 11 for the cartridge handling mechanism 16 and other components and structure of the tape library 11.

The carriage 138 slides along the carriage guide 88 and guides the receiver body 136 along the frame 64. The carriage 138 illustrated in the Figures includes a first wall 154 and a spaced apart second wall 156 and a carriage base 158. A distal end 160 of each wall 154, 156 extends upward from the carriage base 158. A wall aperture (not shown) extends through each wall 154, 156 near the distal end 160. An attachment shaft 164 extends through the wall aperture in each wall 154, 156 and the side aperture 153 in each side 146 of the receiver body 136. This structure allows the receiver body 136 to pivot relative to the carriage 138 around the attachment bolt 164.

The carriage 138 also includes a carriage aperture 166 that extends transversely through the walls 154, 156. Two linear bearings 168 are positioned in a bearing mount (not shown) that is attached to the carriage 138. The linear bearings 168 are sized and shaped to receive the carriage guide 88 and create a linear bearing with the carriage guide 88. This allows the carriage 138 to easily slide along the frame 64. Stated another way, the linear bearings 168 interact with the carriage guide 88 to form a linear bearing which guides the carriage 138 along a linear path relative to the frame 64.

The linkage 132 extends between the follower body 130 and the transporter 68. The follower body 130 extends between the linkage 132 and the carriage 138. Stated another way, the linkage 132 is attached to the follower body 130 and the receiver body 136 with a first pair of linkage shafts 170 and the follower body 130 is attached to the carriage 138 with the link shaft 134. This arrangement allows the follower body 130 to pivot relative to the carriage 138. Further, this arrangement allows the follower body 130 to pivot the receiver body 136 between the load/unload positions 70A, 70B and the transport position 72.

The linkage 132 illustrated in the FIGS. 9 and 10 is somewhat "L" shaped and includes an upper link 174 and a lower link 176 which are attached together with a pair of link bolts 178. The link bolts 178 allow for the adjustment of the length of the first linkage 132 between the follower body 130 and the receiver body 136. This allows for the adjustment of the position of the receiver body 136 relative to the follower body 130.

The latch 140 selectively locks or secures the cartridge 20 in the receiver slot 150 during transport between adjacent tape libraries 11. More specifically, the latch 140 moves between a locked position 180 (illustrated in FIG. 10) in which the latch 140 retains the cartridge 20 in the receiver slot 150 and an unlocked position 182 (illustrated in FIG. 9) in which the cartridge 20 can be removed from the receiver slot 150. The latch 140 is in the locked position 180 when the receiver body 136 is in the transport position 72 and unlocked position 182 when the receiver body 136 is in the load/unload positions 70A, 70B.

The design of the latch 140 can be varied. In the embodiment illustrated in the Figures, the latch 140 includes a leaf spring 183 that moves with and is attached to the upper link 174. In this design, the upper link 174 includes an integral transverse beam 184 that extends transversely above the top 144 of the receiver body 136. The leaf spring 183 is attached to the transverse beam 184 and extends at a right angle away from the transverse beam 184 above the top 144 of the receiver body 136.

When the latch 140 is in the locked position 180, the leaf spring 183 extends through the cut-out 152 in the top 144 and engages the cartridge 20 in the receiver slot 150. More specifically, the leaf spring 183 compresses against the cartridge 20 and forces the cartridge 20 towards the bottom 142 of the receiver body 136. In this position, a portion of the cartridge 20 is below the lips 151 of the receiver body 136. Thus, the leaf spring 183 and the lips 151 cooperate to securely retain the cartridge 20 in the receiver slot 150. When the latch 140 is in the unlocked position 182, the leaf spring 183 is uncompressed and is maintained outside the cut-out 152 and the receiver slot 150.

Referring to FIGS. 9 and 10, the leaf spring 183 pivots with the upper link 174 while the receiver body 136 pivots around the attachment bolt 164. This structure allows the leaf spring 183 to rotate at a different rate than the receiver body 136. This allows the leaf spring 183 of the latch 140 to move between the locked position 180 and the unlocked position 182 during movement of the receiver body 136 between the transport position 72 and the load/unload positions 70A, 70B.

OPERATION

The movement of a cartridge 20 between tape libraries 10 can probably best be understood with reference to FIGS. 2, 3 and 8–10. Initially, the receiver body 136 is moved to the first load/unload position 70A in one of the tape libraries 11. In the first load/unload position 70A, the wheel 121 engages the upper follower guide 118A and pulls the receiver body 136 with the first linkage 132 into the first load/unload position 70A. At this time, the latch 140 is also rotated to the unlocked position 182. One of cartridges 20 is removed from one of the storage bins 14 or one of the cartridge readers 18 with the cartridge handling mechanism 16 and placed in the receiver slot 150 of the transporter 68. Next, the motor 96 rotates the drive pulley 98 and moves the transporter 68 linearly along the frame 64.

As transporter 68 moves along the frame 64, the wheel 121 engages the lower follower guide 118B. In the ramped section 126, the interaction between the wheel 121 and the lower follower guide 118B causes the wheel 121 and the follower body 130 to lift upwardly and pivot relative to the carriage 138. The linkage 132 is coupled to the follower body 130 and moves upward with the follower body 130. The linkage 132 is also coupled to the receiver body 136 and the latch 140. Thus, movement of the linkage 132 upward causes the receiver body 136 to rotate relative to the attachment shaft 164 and the latch 140 to rotate from the unlocked position 182 towards the locked position 180.

The wheel 121 continues to engage the lower follower guide 118B and lift the receiver body 136 until the wheel 121 enters the upper section 128 of the lower follower guide 118B. At this time, the follower 120, via the linkage 132, has caused the receiver body 136 to rotate into the transport position 72 and the latch 140 to rotate to the locked position 180. The upper follower guide 118A inhibits the receiver body 136 from over rotating past the transport position 72.

As the transporter 68 is moved further along the frame 64, the wheel 121 begins to roll down the ramped section 126 of the lower follower guide 118A. The interaction between the wheel 121 and the lower follower guide 118A causes the wheel 121 and the follower body 130 to pivot downward relative to the carriage 138. The linkage 132 is coupled to the follower body 130 and moves downward with the follower body 130. Movement of the linkage 132 downward causes the receiver body 136 to rotate relative to the attachment bolt 164 and the latch 140 to rotate from the locked position 180 towards the unlocked position 182.

The wheel 121 continues to roll down the lower follower guide 118B and pull the receiver body 136 downward until the wheel 121 enters the lower section 124 of the lower follower guide 118B and the adjustable follower guide 129B. At this time, the follower 120, via the linkage 132, has caused the receiver body 136 to rotate into the second load/unload position 70B and the latch 140 to rotate to the unlocked position 180. A transporter adjustment screw 186 engages the bottom 142 of the receiver body and inhibits the receiver body 136 from over rotating past the load/unload position 70.

With the receiver body 136 in the second load/unload position 70B and the latch 140 in the unlocked position 182, the cartridge 20 can be removed from the receiver slot 150 and placed in one of the storage bins 14 or one of the cartridge readers 18 with the cartridge handling mechanism 16. This process can be repeated or reversed until all of the cartridges 20 are individually moved between the tape libraries 11.

Importantly, rotation of the receiver body 136 to the transport position 72 allows the transport mechanism 22 to securely retain the cartridge 20 during transport between tape libraries 11. Further, this minimizes the horizontal profile of the transport mechanism 22 and provides more space in each tape library 11 for the cartridge handling mechanism 16, structure and other components of the tape library 11.

While the particular transport mechanism 22 and storage system 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A storage system for use with a plurality of cartridges, the storage system comprising:
   a first tape library and a second tape library, each tape library including a library cavity; and
   a transport mechanism which extends into the library cavities, the transport mechanism including (i) a frame which extends between the tape libraries, the frame having a longitudinal axis that generally extends between the tape libraries, (ii) a transporter which receives one of the cartridges, and (iii) a mover which moves the transporter along the frame, the mover pivoting a portion of the transporter about an axis that is substantially parallel to the longitudinal axis.

2. The storage system of claim 1 including a latch for selectively securing one of the cartridges in the transporter.

3. The storage system of claim 1 wherein the transporter includes a carriage that moves substantially parallel to the longitudinal axis, and a receiver body that is adapted to receive one of the cartridges, and wherein the mover pivots the receiver body relative to the carriage.

4. The storage system of claim 3 wherein the mover includes a follower that is coupled to the receiver body so that movement of the follower results in pivoting of the receiver body.

5. The storage system of claim 4 wherein the follower moves along a follower guide that causes the follower to pivot the receiver body between a substantially horizontal load/unload position and a non-horizontal transport position.

6. The storage system of claim 5 wherein the follower guide defines a substantially non-linear path.

7. The storage system of claim 5 wherein the follower guide includes a ramped section.

8. The storage system of claim 5 wherein the follower guide includes a pair of spaced apart ramped sections.

9. The storage system of claim 5 wherein the follower guide includes a pair of spaced apart lower sections and an upper section positioned substantially between the lower sections.

10. The storage system of claim 9 wherein the follower guide includes a ramped section that is positioned substantially between the lower sections and the upper section.

11. The storage system of claim 5 wherein the follower guide defines a substantially non-linear path and the follower includes a wheel that is moved along the follower guide.

12. The storage system of claim 5 wherein the transport position is between approximately 45 degrees and 90 degrees from the load/unload position.

13. The storage system of claim 4 including a latch coupled to the follower so that movement of the follower results in pivoting of the latch to a locked position in which the latch secures the cartridge in the receiver body.

14. The storage system of claim 13 wherein the latch and the receiver body pivot at different rates relative to the carriage.

15. The storage system of claim 4 wherein the follower moves along a follower guide that causes the follower to move the receiver body relative to the carriage between a load/unload position and a transport position.

16. The storage system of claim 3 wherein the mover includes a motor that moves the carriage substantially linearly.

17. The storage system of claim 3 wherein the receiver body pivots less than approximately 90 degrees about the axis that is substantially parallel to the longitudinal axis.

18. The storage system of claim 1 wherein the transporter pivots less than approximately 90 degrees during transport along the frame between the tape libraries.

19. A storage system for use with a plurality of cartridges, the storage system comprising:
   a first tape library and a second tape library, each tape library including a library cavity;
   a frame that extends between the tape libraries, the frame having a longitudinal axis; and
   a transporter that receives one of the cartridges, the transporter being adapted to move along the frame between the tape libraries and pivot about an axis that is substantially parallel to the longitudinal axis, the transporter pivoting between a load/unload position and a transport position.

20. The storage system of claim 19 wherein the load/unload position is substantially horizontal.

21. The storage system of claim 19 further comprising a follower that is coupled to the transporter so that movement of the follower results in pivoting of the transporter.

22. The storage system of claim 21 wherein the follower moves along a follower guide that causes the follower to pivot the transporter between the load/unload position and the transport position.

23. The storage system of claim 22 wherein the follower guide defines a substantially non-linear path.

24. The storage system of claim 22 wherein the follower guide includes a pair of spaced apart ramped sections.

25. The storage system of claim 19 further comprising a latch that selectively secures the cartridge in the transporter.

26. The storage system of claim 25 wherein the latch is adapted to pivot, and wherein the latch and the transporter pivot at different rates relative to the frame.

27. The storage system of claim 19 further comprising a mover which pivots a portion of the transporter relative to the frame and moves the transporter along the frame between the tape libraries.

28. The storage system of claim 27 wherein the transporter includes a receiver body and a carriage, the receiver body being adapted to receive the cartridge, and wherein the mover pivots the receiver body relative to the carriage between a substantially horizontal load/unload position and a transport position.

29. The storage system of claim 19 wherein the transporter pivots less than approximately 90 degrees about the axis that is substantially parallel to the longitudinal axis.

30. A method for transporting a cartridge between a first tape library and a second tape library, the method comprising the steps of:
   positioning a transport mechanism between the tape libraries, the transport mechanism including a frame that extends between the tape libraries and a transporter, the frame having a longitudinal axis;
   positioning the cartridge in the transporter;
   moving the transporter along the frame between the tape libraries; and
   pivoting the transporter about an axis that is substantially parallel to the longitudinal axis, the transporter pivoting between a load/unload position and a transport position.

31. The method of claim 30 wherein the step of positioning the cartridge includes securing the cartridge in the transporter with a latch.

32. The method of claim 30 further comprising the step of removing the cartridge from the transporter with a cartridge handling mechanism.

33. The method of claim 30 wherein the step of pivoting the transporter includes pivoting the transporter greater than approximately 45 degrees and less than approximately 90 degrees about the axis that is substantially parallel to the longitudinal axis.

34. A storage system adapted for use with a plurality of cartridges, the storage system comprising:
   a first tape library and a second tape library, each tape library including a library cavity; and a transport mechanism which extends into the library cavities, the transport mechanism including (i) a frame which extends between the tape libraries, the frame having a longitudinal axis that generally extends between the tape libraries, (ii) a transporter which receives one of the cartridges, and (iii) a mover which moves the transporter along the frame, the mover pivoting a portion of the transporter relative to the frame about an axis that is substantially parallel to the longitudinal axis.

35. The storage system of claim 34 including a latch for selectively securing one of the cartridges in the transporter.

36. The storage system of claim 34 wherein the transporter includes a carriage that moves substantially parallel to the longitudinal axis, and a receiver body that is adapted to receive one of the cartridges, and wherein the mover pivots the receiver body relative to the carriage.

37. The storage system of claim 36 wherein the mover includes a follower that is coupled to the receiver body so that movement of the follower results in pivoting of the receiver body.

38. The storage system of claim 37 wherein the follower moves along a follower guide that causes the follower to pivot the receiver body between a substantially horizontal load/unload position and a non-horizontal transport position.

39. The storage system of claim 38 wherein the follower guide defines a substantially non-linear path.

40. The storage system of claim 38 wherein the follower guide includes a ramped section.

41. The storage system of claim 38 wherein the follower guide includes a pair of spaced apart ramped sections.

42. The storage system of claim 38 wherein the follower guide includes a pair of spaced apart lower sections and an upper section positioned substantially between the lower sections.

43. The storage system of claim 42 wherein the follower guide includes a ramped section that is positioned substantially between the lower sections and the upper section.

44. The storage system of claim 38 wherein the follower guide defines a substantially non-linear path and the follower includes a wheel that is moved along the follower guide.

45. The storage system of claim 38 wherein the transport position is between approximately 45 degrees and 90 degrees from the load/unload position.

46. The storage system of claim 37 including a latch coupled to the follower so that movement of the follower results in pivoting of the latch to a locked position in which the latch secures the cartridge in the receiver body.

47. The storage system of claim 46 wherein the latch and the receiver body pivot at different rates relative to the carriage.

48. The storage system of claim 37 wherein the follower moves along a follower guide that causes the follower to move the receiver body relative to the carriage between a load/unload position and a transport position.

49. The storage system of claim 36 wherein the mover includes a motor that moves the carriage substantially linearly.

50. The storage system of claim 36 wherein the receiver body pivots less than approximately 90 degrees about the axis that is substantially parallel to the longitudinal axis.

51. The storage system of claim 34 wherein the transporter pivots less than approximately 90 degrees during transport along the frame between the tape libraries.

52. A storage system adapted for use with a plurality of cartridges, the storage system comprising:

a first tape library and a second tape library, each tape library including a library cavity;

a frame that extends between the tape libraries, the frame being fixedly connected to at least one of the tape libraries, the frame having a longitudinal axis; and a transporter that receives one of the cartridges, the transporter being adapted to move along the frame between the tape libraries and pivot about an axis that is substantially parallel to the longitudinal axis, the transporter pivoting between a load/unload position and a transport position.

53. The storage system of claim 52 wherein the load/unload position is substantially horizontal.

54. The storage system of claim 52 further comprising a follower that is coupled to the transporter so that movement of the follower results in pivoting of the transporter.

55. The storage system of claim 54 wherein the follower moves along a follower guide that causes the follower to pivot the transporter between the load/unload position and the transport position.

56. The storage system of claim 55 wherein the follower guide defines a substantially non-linear path.

57. The storage system of claim 55 wherein the follower guide includes a pair of spaced apart ramped sections.

58. The storage system of claim 52 further comprising a latch that selectively secures the cartridge in the transporter.

59. The storage system of claim 58 wherein the latch is adapted to pivot, and wherein the latch and the transporter pivot at different rates relative to the frame.

60. The storage system of claim 52 further comprising a mover which pivots a portion of the transporter relative to the frame and moves the transporter along the frame between the tape libraries.

61. The storage system of claim 60 wherein the transporter includes a receiver body and a carriage, the receiver body being adapted to receive the cartridge, and wherein the mover pivots the receiver body relative to the carriage between a substantially horizontal load/unload position and a transport position.

62. The storage system of claim 52 wherein the transporter pivots less than approximately 90 degrees about the axis that is substantially parallel to the longitudinal axis.

63. A method for transporting a cartridge between a first tape library and a second tape library, the method comprising the steps of:

positioning a transport mechanism between the tape libraries, the transport mechanism including (i) a frame that extends between the tape libraries, and (ii) a transporter, the frame having a longitudinal axis;

positioning the cartridge in the transporter;

moving the transporter along the frame between the tape libraries; and pivoting the transporter about an axis that is substantially parallel to the longitudinal axis, the transporter pivoting relative to the frame between a load/unload position and a transport position.

64. The method of claim 63 wherein the step of positioning the cartridge includes securing the cartridge in the transporter with a latch.

65. The method of claim 63 further comprising the step of removing the cartridge from the transporter with a cartridge handling mechanism.

66. The method of claim 63 wherein the step of pivoting the transporter includes pivoting the transporter greater than approximately 45 degrees and less than approximately 90 degrees about the axis that is substantially parallel to the longitudinal axis.

* * * * *